United States Patent
Kim et al.

(10) Patent No.: US 8,283,064 B2
(45) Date of Patent: Oct. 9, 2012

(54) ELECTRODE ASSEMBLY AND SECONDARY BATTERY USING THE SAME

(75) Inventors: Cheon-Soo Kim, Suwon-si (KR); Dae-Junc Jeong, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 320 days.

(21) Appl. No.: 12/789,654

(22) Filed: May 28, 2010

(65) Prior Publication Data

US 2010/0310912 A1  Dec. 9, 2010

(30) Foreign Application Priority Data

Jun. 5, 2009  (KR) .................. 10-2009-0049930

(51) Int. Cl.
*H01M 4/00* (2006.01)

(52) U.S. Cl. .......... 429/94; 429/131; 429/178; 429/138; 429/186

(58) Field of Classification Search .................. 429/94, 429/131, 136, 138, 139, 161, 178, 185, 186
See application file for complete search history.

(56) References Cited

U.S. PATENT DOCUMENTS

| | | | |
|---|---|---|---|
| 2003/0113616 A1 | 6/2003 | Kasuga et al. | |
| 2005/0084753 A1 | 4/2005 | Kim | |
| 2006/0093922 A1* | 5/2006 | Kim et al. | 429/251 |
| 2006/0251962 A1 | 11/2006 | Kim | |
| 2007/0154788 A1* | 7/2007 | Hong et al. | 429/130 |

FOREIGN PATENT DOCUMENTS

| | | |
|---|---|---|
| JP | 11-297349 | 10/1999 |
| JP | 2000-144074 | 5/2000 |
| JP | 2003-168470 | 6/2003 |
| JP | 2004-253330 | 9/2004 |
| JP | 3851153 | 9/2006 |
| JP | 2007-242518 | 9/2007 |
| KR | 10-0686851 B1 | 2/2007 |
| KR | 10-2007-0025682 | 3/2007 |
| KR | 10-2007-0101444 | 10/2007 |
| KR | 10-2008-0047153 | 5/2008 |

OTHER PUBLICATIONS

KIPO Decision of Grant dated Dec. 26, 2011, for Korean priority Patent application 10-2009-0049930, 1 page.

(Continued)

*Primary Examiner* — Raymond Alejandro
(74) *Attorney, Agent, or Firm* — Christie, Parker & Hale, LLP

(57) ABSTRACT

An electrode assembly of a secondary battery includes an electrode group including a first electrode plate, a separator, and a second electrode plate that are stacked and wound, and a finishing tape attached to a predetermined region of a terminal portion of the electrode group. The finishing tape satisfies the equation Y1=tensile strength×thickness of finishing tape/modulus of elasticity, with Y1 ranging from 64 to 89. Alternatively, the finishing tape includes a film layer and an adhesive layer, and satisfies the equation Y2=tensile strength×thickness of film layer of finishing tape/modulus of elasticity, with Y2 ranging from 51 to 75. The finishing tape effectively prevents an increase in the thickness of a high-capacity secondary battery.

22 Claims, 4 Drawing Sheets

OTHER PUBLICATIONS

European Search Report dated Sep. 17, 2010, for corresponding European Patent application 10164392.2, as well as U.S. Publication 2003/0113616.

Patent Abstracts of Japan and English machine translation of Japanese Patent 11-297349.

Patent Abstracts of Japan and English machine translation of Japanese Publication 2007-242518.

SIPO Search Report dated Aug. 17, 2012, for corresponding to Chinese Patent application 201010192894.0, with English translation, (8 pages).

Patent Abstracts of Japan, and English machine translation of Japanese Publication 2000-144074 listed above, (8 pages).

* cited by examiner

ELECTRODE ASSEMBLY AND SECONDARY BATTERY USING THE SAME

CROSS-REFERENCE TO RELATED APPLICATIONS

This application claims the benefit of Korean Patent Application No. 10-2009-0049930 filed on Jun. 5, 2009, in the Korean Intellectual Property Office, the disclosure of which is incorporated herein by reference in its entirety.

BACKGROUND OF THE INVENTION

1. Field of the Invention

Aspects of the invention relate to an electrode assembly and a secondary battery using the same, and more particularly, to an electrode assembly capable of increasing the capacity of a battery.

2. Description of the Related Art

Various batteries have been employed as power sources for electronic devices. Particularly, lithium secondary batteries have been widely used as power sources for small-sized electronic devices because they are compact and rechargeable, enable formation of high-capacity devices, and have high energy densities per unit area.

Formation of a lithium secondary battery may involve housing an electrode assembly in a cell case, injecting an electrolyte into the cell case, and sealing the cell case. The electrode assembly may be formed by stacking a positive electrode plate, a negative electrode plate, and a separator interposed therebetween and winding the stacked structure. Also, the positive electrode plate and the negative electrode plate may be obtained by coating active materials on a positive electrode collector and a negative electrode collector, respectively.

Lithium secondary batteries may be classified into a cylindrical type, a prismatic type, and a pouch type according to the external appearance of a cell case.

In general, an electrode assembly may be wound and wrapped with a tape so that the electrode assembly cannot unwind when fixedly housed in a cell case. Specifically, the tape may be attached to an outer circumferential surface of the electrode assembly in which a positive electrode plate, a separator, and a negative electrode plate are sequentially wound. The tape may wrap around a wound terminal portion of the outer circumferential surface of the electrode assembly. As known to those skilled in the art, the tape is typically called a finishing tape. However, use of the finishing tape may lead to an increase in the entire thickness of a secondary battery, thus hindering formation of a high-capacity secondary battery.

In order to form high-capacity secondary batteries without increasing the volume of a can, it is necessary to increase the amounts of positive and negative electrode active materials in the can. The amount of an electrolyte injected into the can should be increased according to the increase in the amounts of the positive and negative electrode active materials in order to ensure a predetermined lifespan.

Accordingly, a margin of an internal volume of the can (i.e., an area between the can and the electrode assembly) may be required to increase the amount of the electrolyte. However, since the finishing tape has a non-zero thickness, the margin of the internal volume of the can may be reduced according to the thickness of the finishing tape.

SUMMARY OF THE INVENTION

Aspects of the invention relate to a secondary battery whose capacity is increased by reducing the thickness of a finishing tape.

According to an aspect of the invention, an electrode assembly and a secondary battery using the same are provided. The electrode assembly includes an electrode group including a first electrode plate, a separator, and a second electrode plate that are sequentially stacked and wound; and a finishing tape attached to a predetermined region of a terminal portion of the electrode group. The finishing tape satisfies the following equation, with Y1 ranging from 64 to 89 when a tensile strength of the finishing tape is expressed in $kgf/cm^2$, a thickness of the finishing tape is expressed in μm, and a modulus of elasticity of the finishing tape is expressed in $kgf/mm^2$:

$$Y1 = \frac{\text{tensile strength} \times \text{thickness of finishing tape}}{\text{modulus of elasticity}}.$$

According to an aspect of the invention, an electrode assembly and a secondary battery using the same are provided. The electrode assembly includes an electrode group including a first electrode plate, a separator, and a second electrode plate that are sequentially stacked and wound; and a finishing tape attached to a predetermined region of a terminal portion of the electrode group. The finishing tape includes a film layer and an adhesive layer, and satisfies the following equation, with Y2 ranging from 51 to 75 when a tensile strength of the finishing tape is expressed in $kgf/cm^2$, a thickness of the film layer of the finishing tape is expressed in μm, and a modulus of elasticity of the finishing tape is expressed in $kgf/mm^2$:

$$Y2 = \frac{\text{tensile strength} \times \text{thickness of film layer of finishing tape}}{\text{modulus of elasticity}}.$$

According to an aspect of the invention, the finishing tape has a thickness of about 15 μm to 19 μm.

According to an aspect of the invention, the finishing tape has a width of about 10 mm or more in a wound direction of the electrode group, and a length equal to at least 25% of a total height of the electrode assembly.

According to an aspect of the invention, the finishing tape is one of two finishing tapes respectively attached to upper and lower portions of the electrode group, each of the finishing tapes has a width of about 10 mm or more in a wound direction of the electrode group, and a sum of lengths of the two finishing tapes is equal to at least 25% of a total height of the electrode assembly.

According to an aspect of the invention, the finishing tape is one of two finishing tapes respectively attached to upper and lower portions of the electrode group, a sum of lengths of the two finishing tapes is equal to at least 25% of a total height of the electrode assembly, and each of the finishing tapes has a width in a wound direction of the electrode group that enables each of the two finishing tapes to wrap around an entire outer surface of the electrode group in the wound direction of the electrode group.

According to an aspect of the invention, the finishing tape has a length equal to a total height of the electrode assembly, and a width in a wound direction of the electrode group that enables the finishing tape to wrap around an entire outer surface of the electrode group in the wound direction of the electrode group.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Figure 1:
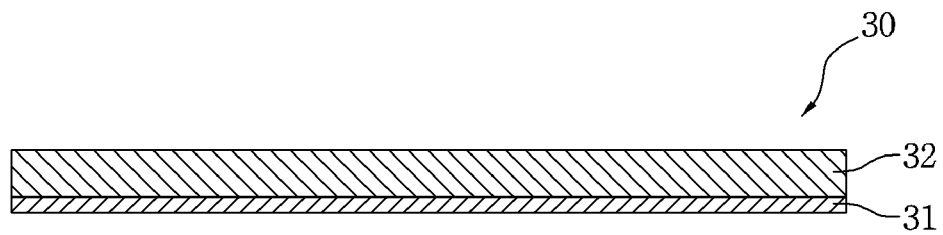
FIG. 1 is a cross-sectional view of a finishing tape according to an aspect of the invention.

Reference will now be made in detail to embodiments of the invention, examples of which are shown in the accompanying drawings, wherein like reference numerals refer to like elements throughout. The embodiments are described below to explain the invention by referring to the figures. Aspects of the invention may, however, be embodied in many different forms and should not be construed as being limited to the embodiments described herein. Rather, these embodiments are described so that this disclosure is thorough and complete and fully conveys aspects of the invention to those skilled in the art. In the drawings, the thicknesses of layers and regions may be exaggerated for clarity. It is also be understood that when a layer is referred to as being "on" another layer or substrate, it can be directly on the other layer or substrate, or intervening layers may also be present.

FIG. 1 is a cross-sectional view of a finishing tape 30 according to an aspect of the invention. Referring to FIG. 1, the finishing tape 30 includes a film layer 32 and an adhesive layer 31. The film layer 32 may be formed of a polymer resin such as polyethylene, polystyrene, polypropylene, or polyethylene terephthalate (PET). Also, the adhesive layer 31 may be disposed on a bottom surface of the film layer 32 to adhere the film layer 32 to an outermost surface of an electrode assembly (not shown in FIG. 1). The adhesive layer 31 may be formed of, for example, natural rubber, acrylic resin, polyurethane, or polyester. However, the film layer 32 and the adhesive layer 31 according to aspects of the invention are not limited to the above-described materials, and since other suitable materials are well known to those skilled in the art, a detailed description thereof will be omitted here.

The finishing tape 30 according to aspects of the invention may have a thickness of about 19 μm or less. As a result, a margin of an internal volume of a can (i.e., an area between the can and the electrode assembly), which permits injection of an additional amount of electrolyte into the can, may be provided, unlike in a conventional secondary battery that uses a thicker finishing tape.

Also, the finishing tape 30 according to aspects of the invention may have a thickness of about 15 μm or more. This is because it is difficult to fabricate a finishing tape with a thickness of less than 15 μm due to current technical limitations. Accordingly, although it is expected that a finishing tape with a thickness of less than 15 μm would lead to a further increase in a margin of an internal volume of a can, when a finishing tape with a thickness of less than about 15 μm is attached to a wound terminal portion of an electrode assembly, the finishing tape may be torn due to its excessively small thickness. As a result, it would be difficult to effectively fasten the electrode assembly and prevent the electrode assembly from being unwound using a finishing tape with a thickness of less than about 15 μm.

The following Table 1 numerically shows the additional amount of an electrolyte than can be injected into a can resulting from a reduction in the thickness of a finishing tape. In Table 1, it is assumed that the volume of the finishing tape is measured when the finishing tape wraps around the entire electrode assembly as will be described below with reference to FIG. 6. Also, in Table 1, a finishing tape with a thickness of about 22 μm was used as a reference for calculating a decrease in the volume of the finishing tape and the additional amount of the electrolyte for finishing tapes having a thickness of about 19 μm and 15 μm, respectively.

TABLE 1

| | Thickness (μm) of finishing tape | | |
| --- | --- | --- | --- |
| | 22 | 19 | 15 |
| Volume (cc) of finishing tape | 0.066 | 0.057 | 0.045 |
| Decrease (cc) in volume of finishing tape | — | 0.009 | 0.021 |
| Additional amount (g) of electrolyte | — | 0.01 | 0.03 |

Referring to Table 1, when the finishing tapes had a thickness of about 19 μm and 15 μm, respectively, the volumes of the finishing tapes were reduced by as much as 0.009 cc and 0.021 cc, respectively, as compared with when the finishing tape had a thickness of about 22 μm. When the electrolyte had a density of about 1.227 g/cc, additional amounts of 0.01 g of the electrolyte and 0.03 g of the electrolyte could be injected into the can when the volumes of the finishing tapes were decreased by as much as 0.009 cc and 0.021 cc, respectively.

However, although a high-capacity secondary battery may be formed due to the above-described addition of the electrolyte, an increase in the thickness of the secondary battery that results from an increase in the capacity of the secondary battery may be problematic. That is, the formation of the high-capacity secondary battery involves increasing the amount of the electrolyte without increasing the volume of the can. Also, in order to ensure a predetermined lifespan, the amounts of positive and negative electrode active materials in the can should be also increased without increasing the volume of the can. However, for example, inorganic particles contained in the negative electrode active material may store lithium due to charging so that the volume of the inorganic particles may be expanded. The volume expansion may increase as the amount of the electrolyte and the amounts of the positive and negative electrode active materials increase. This may lead to an increase in the thickness of the secondary battery when charged.

Accordingly, it is necessary to prevent the increase in the thickness of the secondary battery when charged. To accomplish this, the finishing tape 30 according to aspects of the invention may preferably satisfy the following Equation 1, and Y1 may preferably range from 64 to 89 when a tensile strength (i.e., an ultimate strength) of the finishing tape 30 is expressed in kgf/cm$^2$, a thickness of the finishing tape 30 is expressed in μm, and a modulus of elasticity (also known as elastic modulus or Young's modulus) of the finishing tape 30 is expressed in kgf/mm$^2$:

$$Y1 = \frac{\text{tensile strength} \times \text{thickness of finishing tape}}{\text{modulus of elasticity}} \quad (1)$$

Alternatively, the finishing tape according to the invention may preferably satisfy the following Equation 2, and Y2 may preferably range from 51 to 75 when a tensile strength of the finishing tape 30 is expressed in kgf/cm², a thickness of a film layer 32 of the finishing tape 30 is expressed in μm, and a modulus of elasticity of the finishing tape 30 is expressed in kgf/mm²:

$$Y2 = \frac{\text{tensile strength} \times \text{thickness of film layer of finishing tape}}{\text{modulus of elasticity}} \quad (2)$$

When each of Y1 and Y2 departs from the above-described ranges, the thickness of the secondary battery when charged may not be effectively reduced. In particular, as will be described later, when Y1 is less than 64 and Y2 is less than 51, the thickness of the secondary battery when charged may not be effectively reduced as compared with the thickness of conventional battery.

FIGS. 2 through 6 are perspective views of various shapes of finishing tapes 30a, 30b, 30c, 30d, and 30e according to aspects of the invention.

Figure 2:
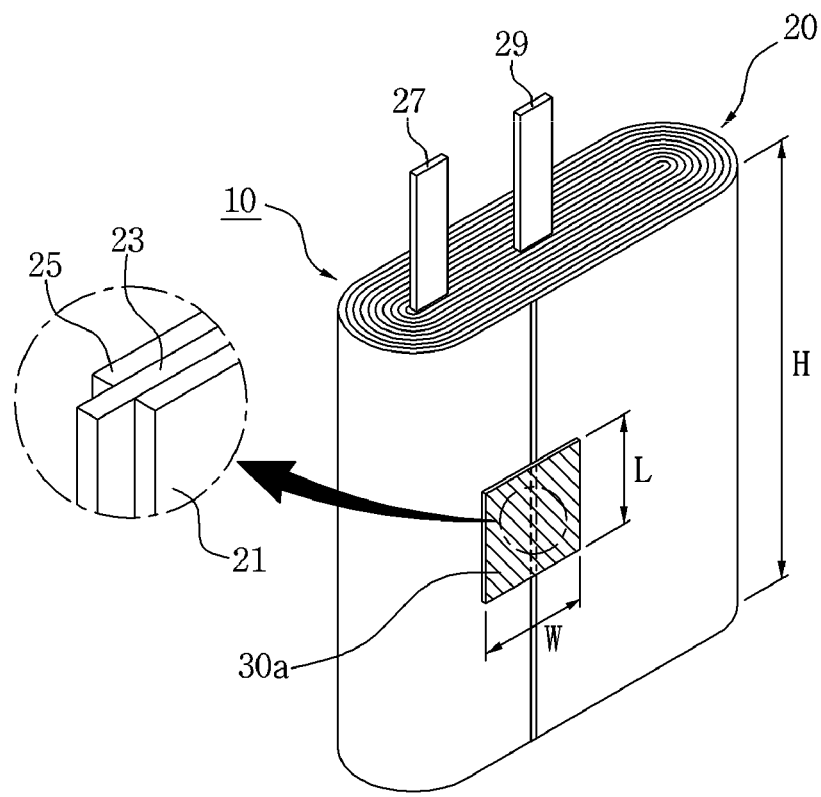
FIGS. 2 through 6 are perspective views of various shapes of finishing tapes according to aspects of the invention.

FIG. 2 is a perspective view of a finishing tape 30a according to an aspect of the invention. Referring to FIG. 2, an electrode assembly 10 includes an electrode group 20, which includes a first electrode plate 21, a separator 23, and a second electrode plate 25 that are sequentially stacked and wound.

The first and second electrode plates 21 and 25 may be formed by coating a positive electrode active material on a positive electrode collector and coating a negative electrode active material on a negative electrode collector, respectively, so that the first and second electrode plates 21 and 25 have different polarities. Each of the first and second electrode plates 21 and 25 may have a non-coating portion on which a positive electrode active material or a negative electrode active material is not coated. A first electrode tab 27 and a second electrode tab 29 may be attached to the non-coating portions of the first and second electrode plates 21 and 25, respectively, so that electrical conduction is possible.

When any one of the first and second electrode plates 21 and 25 is a positive electrode plate, a lithium transition metal oxide may be used as the positive electrode active material, and a plate formed of aluminum may be used as the positive electrode collector. When any one of the first and second electrode plates 21 and 25 is a negative electrode plate, carbon and a carbon composite may be used as the negative electrode active material, and a plate formed of copper may be used as the negative electrode collector. The separator 23 an electrical short from occurring between the first and second electrode plates 21 and 25. The separator 23 may be a porous layer formed of a polyolefin-based resin, such as polyethylene or polypropylene. However, the positive and negative electrode active materials, the positive and negative electrode collectors, and the separator 23 according to aspects of the invention are not limited to the above-described materials, and since other suitable materials are well known to those skilled in the art, a detailed description thereof will be omitted here.

Although FIG. 2 shows the first electrode plate 21 disposed on the outer side of the electrode group 20, the second electrode plate 25 may be disposed on the outer side of the electrode group instead.

In a wound terminal portion of the electrode group 20, a wound terminal portion of the separator 23 may protrude outward more than a wound terminal portion of each of the first and second electrode plates 21 and 25 and be exposed. That is, since the terminal portion of the separator 23 is exposed, the terminal portion of the separator 23 may become a substantial terminal portion of the electrode group 20.

Alternatively, although not shown in FIG. 2, the wound terminal portion of the first electrode plate 21 may protrude outward more than the wound terminal portion of the separator 23 or the wound terminal portion of the second electrode plate 25 and be exposed. In this case, the terminal portion of the first electrode 21 may become the substantial terminal portion of the electrode group 20. Also, although not shown in FIG. 2, the wound terminal portion of the second electrode plate 25 may protrude outward more than the wound terminal portion of the separator 23 or the wound terminal portion of the first electrode plate 21 and be exposed. In this case, the terminal portion of the second electrode 25 may become the substantial terminal portion of the electrode group 20.

The electrode assembly 10 includes the finishing tape 30a attached to the wound terminal portion of the electrode group 20 to fix a wound state of the first electrode 21, the separator 23, and the second electrode plate 25. The size of the finishing tape 30a should satisfy at least the following conditions: the finishing tape 30a should have a width W of about 10 mm or more, and a length L equal at least 25% of the total height H of the electrode assembly 10. The size of the finishing tape 30a should satisfy the above-described conditions so that the finishing tape 30a, whose thickness ranges from about 15 μm to 19 μm, can fasten the electrode assembly 10 and prevent the electrode assembly 10 from unwinding.

Since the electrode assembly 10 has a wound shape, the electrode assembly 10 tends to unwind due to its own resilience. In order to prevent the electrode assembly 10 from unwinding, when the finishing tape 30a has a thickness of about 15 μm to 19 μm, the finishing tape 30a should have a width W of about 10 mm or more, and a length L equal to at least 25% of the total height H of the electrode assembly 10. When the finishing tape 30a has a width W of about 10 mm or more, each of two portions divided in a widthwise direction of the wound terminal portion of the first electrode plate 21 may have a width of about 5 mm or more.

Here, only the lower limits of the width W and length L of the finishing tape 30a are defined because aspects of the invention are aimed at minimizing an area occupied by the finishing tape 30a. In other words, when the width W and length L of the finishing tape 30a according to aspects of the invention are within the above-described lower limits, the finishing tape 30a may effectively fix the electrode assembly 10. Accordingly, the lower limits of the width W and length L of the finishing tape 30a correspond to values that allow the finishing tape 30a to effectively fasten the electrode assembly 10 and have the smallest area.

Figure 3:
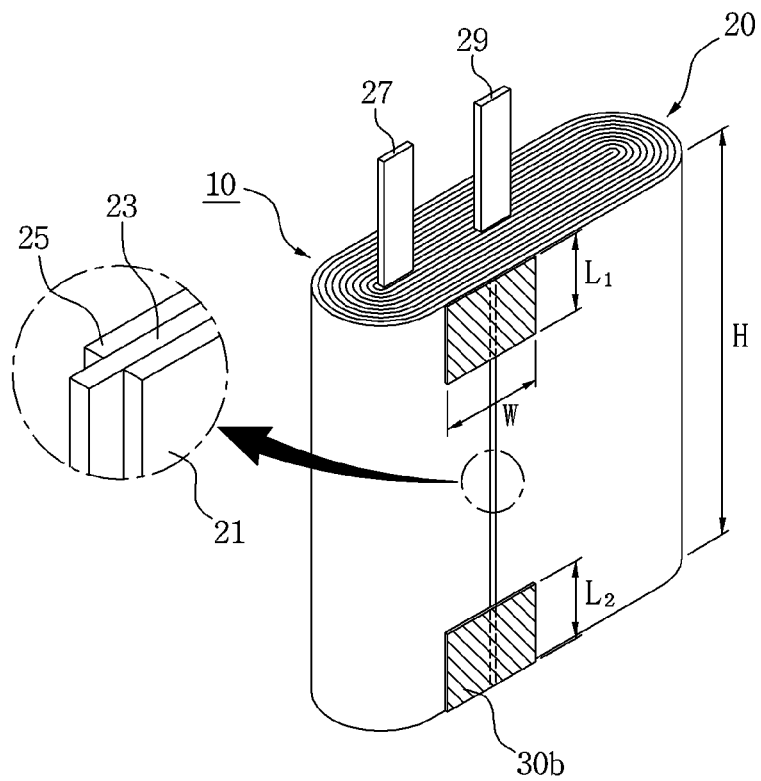

FIG. 3 is a perspective view of a finishing tape 30b according to another aspect of the invention. The finishing tape 30b of FIG. 3 has the same shape as the finishing tape 30a of FIG. 2 except as described in the following description. Referring to FIG. 3, unlike the finishing tape 30a of FIG. 2, the finishing tape 30b is attached to each of upper and lower portions of a terminal portion of an electrode group 20. That is, FIG. 2 shows a single finishing tape 30a attached to the terminal portion of the electrode group 20, while FIG. 3 shows two finishing tapes 30b attached to the terminal portion of the electrode group 20.

The size of each of the finishing tapes 30b should satisfy at least the following conditions. That is, each of the finishing tapes 30b should have a width W of about 10 mm or more, and the sum (L1+L2) of lengths L1 and L2 of the finishing tapes 30b should be at least 25% of the total height H of the electrode assembly 10. The size of the finishing tapes 30b should satisfy the above-described conditions so that the finishing tapes 30b, each of which has a thickness ranging from about 15 μm to 19 μm, can fasten the electrode assembly 10 and prevent the electrode assembly 10 from unwinding.

Alternatively, although not shown in FIG. 3, a number 'n' of finishing tapes (n is a natural number) may be attached to the terminal portion of the electrode group 20. In this case, each of the finishing tapes 30b should have a width W of about 10 mm or more, and the sum (L1+L2+L3+ . . . Ln) of the lengths of the respective finishing tapes 30b should be at least 25% of the total height H of the electrode assembly 10.

Figure 4:
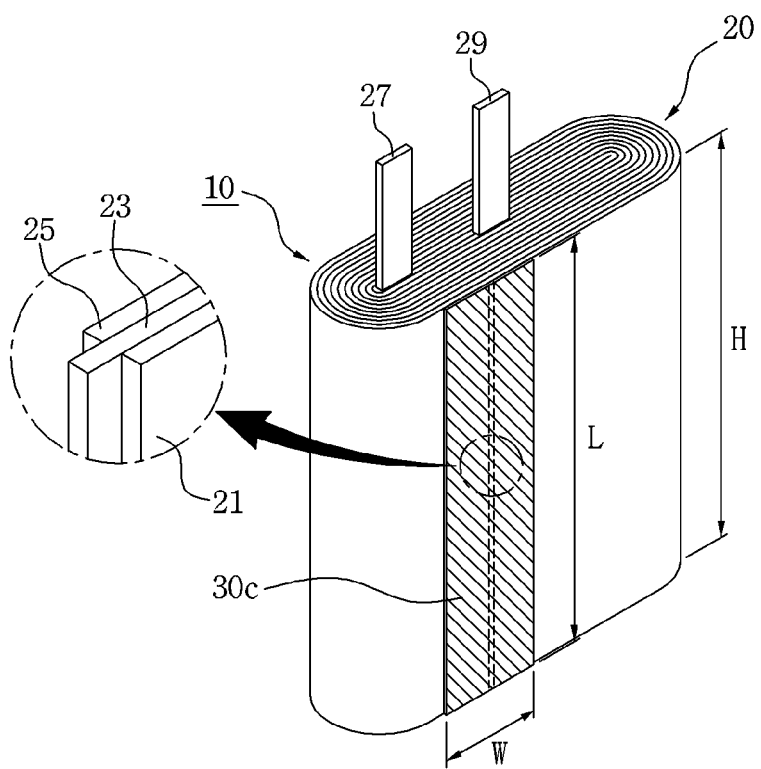

FIG. 4 is a perspective view of a finishing tape 30c according to another aspect of the invention. The finishing tape 30c of FIG. 4 has the same shape as the finishing tape 30a of FIG. 2 except as described in the following description. Referring to FIG. 4, unlike the finishing tape 30a of FIG. 2, the finishing tape 30c is attached to the entire terminal portion of an electrode group 20. That is, the finishing tape 30c has a width W of about 10 mm or more, and a length L equal to the total height H of an electrode assembly 10. As compared with the finishing tape 30a of FIG. 2, an area occupied by the finishing tape 30c is increased, but the electrode assembly 10 is fastened more effectively by the finishing tape 30c.

Figure 5:
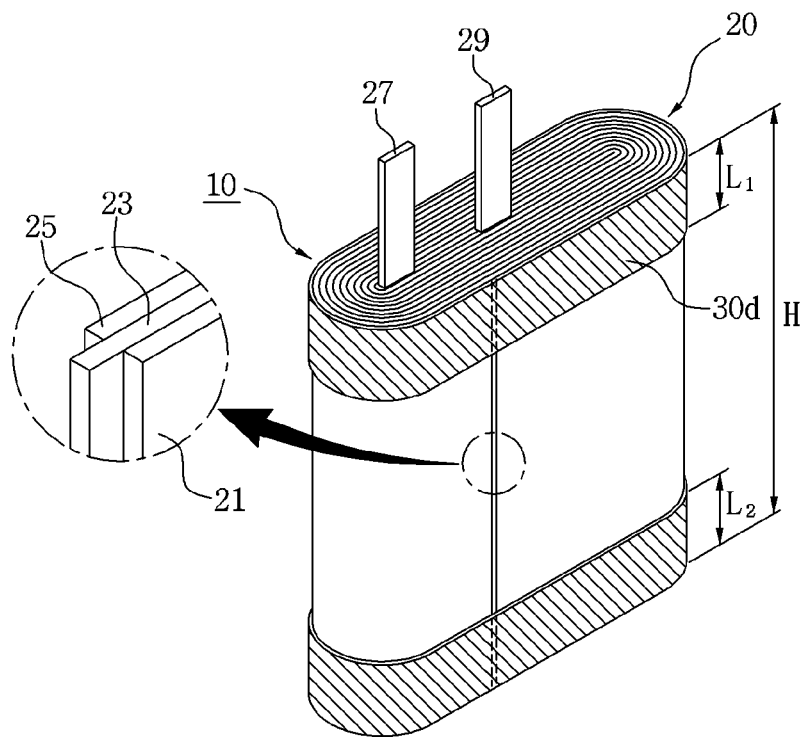

FIG. 5 is a perspective view of a finishing tape 30d according to another aspect of the invention. The finishing tape 30d of FIG. 5 has the same shape as the finishing tape 30b of FIG. 3 except as described in the following description. Referring to FIG. 5, unlike the finishing tape 30b of FIG. 3, the finishing tape 30d is attached to and wraps around the entire outer surface of an electrode group 20, which includes a predetermined region of a terminal portion of the electrode group 20, in a wound direction of the electrode group 20. The sum (L1+L2) of lengths of respective finishing tapes 30d are at least 25% of the total length H of an electrode assembly 10. Also, each of the finishing tapes 30d has a width W that enables each of the finishing tapes 30d to wrap around the entire outside of the electrode group 20. As compared with the finishing tapes 30b of FIG. 3, an area occupied by each of the finishing tapes 30d is increased, but the electrode assembly 10 is fastened more effectively by the finishing tapes 30d.

Figure 6:
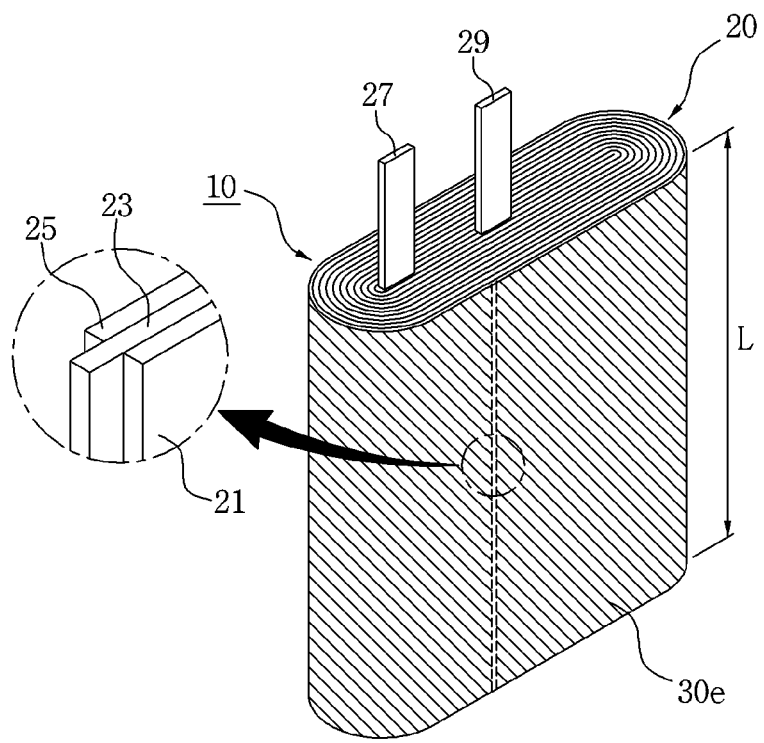

FIG. 6 is a perspective view of a finishing tape 30e according to another aspect of the invention. The finishing tape 30e of FIG. 6 may have the same shape as the finishing tape 30a of FIG. 2 except as described in the following description. Referring to FIG. 6, unlike the finishing tape 30a of FIG. 2, the finishing tape 30e is attached to and wraps around the entire outer surface of an electrode group 20, which includes the entire terminal portion of the electrode group 20, in a wound direction of the electrode group 20. As compared with the finishing tape 30a of FIG. 2, an area occupied by the finishing tape 30e of FIG. 6 is increased, but an electrode assembly 10 is fastened more effectively, and the volume expansion of the electrode assembly 10 may be prevented most effectively. That is, since the finishing tape 30e of FIG. 6 occupies a larger area than any of the finishing tapes 30a to 30d of FIGS. 2 through 5, only the smallest additional amount of electrolyte may be injected into the can, but the finishing tape 30e wraps around the entire electrode assembly 10 so that the volume expansion of the electrode assembly 10 can be prevented most effectively.

Figure 7:
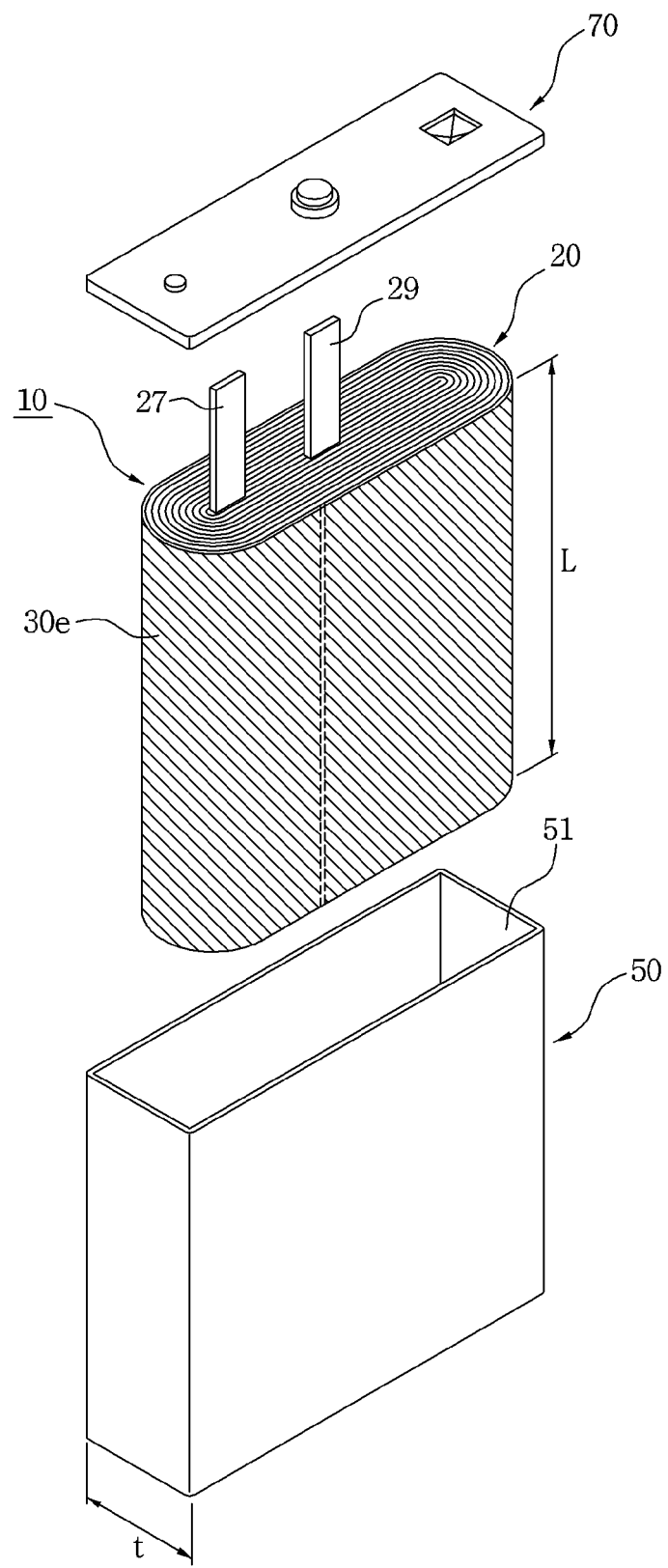
FIG. 7 is an exploded perspective view of a secondary battery including an electrode assembly according to an aspect of the invention.

FIG. 7 is an exploded perspective view of a secondary battery including the electrode assembly 10 according to an aspect of the invention. Referring to FIG. 7, the secondary battery includes the electrode assembly 10, a housing 50 for housing the electrode assembly 10, and a cap assembly 70 for capping the housing 50. The electrode assembly 10 has any of the constructions described with reference to FIGS. 2 through 6 and is housed in the housing 50, but is shown in FIG. 7 with the finishing tape 30e of FIG. 6. The housing 50 housing the electrode assembly 10 has an opening 51 formed at one end thereof. After the electrode assembly 10 is housed in the housing 50, the cap assembly 70 is inserted into the opening 51 to cap the housing 50. The secondary battery further includes an electrolyte injected into the housing 50. The secondary battery has a thickness (t) as shown in FIG. 7.

The electrolyte may be a non-aqueous organic solvent. The non-aqueous organic solvent may be carbonate, ester, ether, or ketone. The carbonate may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), or butylene carbonate (BC). The ester may be butyrolactone (BL), decanolide, valerolactone, mevalonolactone, caprolactone, n-methyl acetate, n-ethyl acetate, or n-propyl acetate. The ether may be dibutyl ether. The ketone may be polymethylvinyl ketone. However, aspects of the invention are not limited to the above-described non-aqueous organic solvents, and since other suitable non-aqueous organic solvents are well known to those skilled in the art, a detailed description thereof will be omitted here.

Also, the electrolyte according to the invention may be lithium salts, which function as a source of lithium ions and enable a lithium ion secondary battery to perform basic operations. For example, the lithium salts may include at least one selected from the group consisting of $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, $LiAlCl_4$, $LiN(C_xF_{2x+1}SO_2)(C_yF_{2x+1}SO_2)$ (x and y are natural numbers), $LiSO_3CF_3$, and a mixture thereof. However, aspects of the invention are not limited to the above-described lithium salts, and since other suitable lithium salts are well known to those skilled in the art, a detailed description thereof will be omitted here.

However, aspects of the invention are not limited to the above-described electrolytes, and since other suitable electrolytes are well known to those skilled in the art, a detailed description thereof will be omitted here.

A secondary battery according to aspects of the invention may be fabricated according to the above-described process. However, aspects of the invention are not limited to the above-described kinds of secondary batteries.

Embodiments according to aspects of the invention and comparative examples will now be described. However, the following experimental examples are only provided according to aspects of the invention, and aspects of the invention are not limited thereto.

EXAMPLE 1

$LiCoO_2$ as a positive electrode active material, polyvinylidene fluoride (PVDF) as a binder, and carbon as a conductive agent were mixed in a weight ratio of 92:4:4 and dispersed in N-methyl-2-pyrrolidone, thereby producing a positive electrode slurry. The positive electrode slurry was coated on a 20 μm-thick aluminum foil, dried, and rolled to form a positive electrode. Artificial black lead as a negative electrode active material, styrene-butadiene rubber as a binder, and carboxymethylcellulose (CMC) as a viscosity agent were mixed in a weight ratio of 96:2:2 and dispersed in water, thereby producing a negative electrode slurry. The negative electrode slurry was coated on a 15 μm-thick copper foil, dried, and rolled to form a negative electrode. A 20 µm-thick film separator formed of polyethylene (PE) was interposed between the positive and negative electrodes. The positive and negative electrodes with the film separator interposed therebetween were wound and compressed to form an electrode assembly and inserted into a prismatic-type can. Thereafter, an electrolyte was injected into the prismatic-type can, thereby fabricating a lithium secondary battery. An additional amount of 0.03 g of the electrolyte was further added as compared with Comparative example 1. Also, a 15 µm-thick finishing tape was attached to a wound terminal portion of the electrode assembly in order to maintain the electrode assembly in a wound state. Also, as shown in FIG. 6, when the finishing tape 30e was attached to the electrode assembly 10, the finishing tape was wrapped around the entire outer surface of the electrode assembly, which includes the entire wound terminal portion of the electrode assembly. The finishing tape included a film layer and an adhesive layer. The film layer was a 12 µm-thick polyethylene terephthalate (PET) layer, and the adhesive layer was a 3 µm-thick acryl adhesive layer.

EXAMPLE 2

The same process as in Example 1 was performed, except that a 16 µm-thick PET layer was used as a film layer, and an additional amount of 0.01 g of an electrolyte was further added as compared with Comparative example 1.

COMPARATIVE EXAMPLE 1

The same process as in Example 1 was performed, except that a 19 µm-thick PET layer was used as a film layer.

COMPARATIVE EXAMPLE 2

The same process as in Example 1 was performed, except that a 25 µm-thick polypropylene (PP) layer was used as a film layer, and a 5 µm-thick acryl adhesive layer was used as an adhesive layer.

The tensile strengths and elastic moduli of finishing tapes of lithium secondary batteries fabricated according to Examples 1 and 2 and Comparative examples 1 and 2 were measured, and values Y1 and Y2 were obtained based on the measured tensile strengths and elastic moduli of finishing tapes from Equations 1 and 2 set forth above. Furthermore, the thicknesses of the lithium secondary batteries fabricated according to Examples 1 and 2 and Comparative examples 1 and 2 when ship-charged (or half-charged) and fully charged were measured as shown in Table 2.

Referring to Table 2, when Y1 exceeded 89 and Y2 exceeded 75 as in Comparative examples 1 and 2, it can be seen that the thicknesses of the secondary batteries when ship-charged and fully charged were far greater than in Example 2. Also, when Y1 was 64 and Y2 was 51 as in Example 1, it can be seen that the thicknesses of the secondary battery when ship-charged and fully charged were greater than in Example 2 and smaller than in Comparative examples 1 and 2. Also, since it is difficult to fabricate a finishing tape with a thickness of less than about 15 µm due to current technical limitations, the values Y1 and Y2 in a case where the finishing tape has a thickness of less than 15 µm could not be obtained. However, it is expected that when the finishing tape has a thickness of less than 15 µm, the values Y1 and Y2 will be smaller than in Example 1.

However, based on an analysis of the data for Example 1 and Comparative example 1, it is expected that when the values Y1 and Y2 are excessively small, the thicknesses of lithium secondary batteries when ship-charged and fully charged will show a tendency to increase. As a result, when Y1 is less than 64 and/or Y2 is less than 51, it is expected that the thicknesses of the lithium secondary batteries when ship-charged and fully charged will hardly decrease or even increase as compared with Comparative example 1.

Accordingly, the finishing tape according to aspects of the invention preferably satisfy Equation 1 set forth above, and Y1 preferably ranges from 64 to 89. Alternatively, the finishing tape according to aspects of the invention preferably satisfy Equation 2 set forth above, and Y2 preferably ranges from 51 to 75.

That is, when each of Y1 and Y2 departs from the above-described ranges, the thickness of the secondary battery when charged may not be effectively reduced. In particular, when Y1 is less than 64 and Y2 is less than 51, the thickness of the secondary battery when charged may not be effectively reduced as compared with the conventional case.

Therefore, aspects of the invention provide a high-capacity secondary battery by reducing the thickness of a finishing tape of an electrode assembly. Also, the finishing tape can effectively prevent an increase in the thickness of the high-capacity secondary battery.

Although embodiments of the invention have been shown and described, it would be appreciated by those skilled in the art that changes may be made in these embodiments without departing from the principles and spirit of the invention, the scope of which is defined in the claims and their equivalents.

TABLE 2

|  |  | Example 1 | Example 2 | Comparative example 1 | Comparative example 2 |
| --- | --- | --- | --- | --- | --- |
| Thickness of finishing tape (µm) | Entire thickness | 15 | 19 | 22 | 30 |
|  | Thickness of film layer | 12 | 16 | 19 | 25 |
|  | Thickness of adhesive layer | 3 | 3 | 3 | 5 |
| Tensile strength (kgf/cm$^2$) |  | 8134 | 9688 | 7506 | 6425 |
| Modulus of elasticity (kgf/mm$^2$) |  | 1908 | 2079 | 1637 | 885 |
| Value Y1 |  | 64 | 89 | 101 | 218 |
| Value Y2 |  | 51 | 75 | 87 | 182 |
| Thickness of battery (µm) | Ship-charged | 3850 | 3830 | 3860 | 3880 |
|  | Fully charged | 3920 | 3910 | 3950 | 3970 |

What is claimed is:

1. An electrode assembly comprising:
   an electrode group comprising a first electrode plate, a separator, and a second electrode plate that are sequentially stacked and wound; and
   a finishing tape attached to a predetermined region of a terminal portion of the electrode group;
   wherein the finishing tape satisfies the following equation, with Y1 ranging from 64 to 89 when a tensile strength of the finishing tape is expressed in kgf/cm$^2$, a thickness of the finishing tape is expressed in μm, and a modulus of elasticity of the finishing tape is expressed in kgf/mm$^2$:

$$Y1 = \frac{\text{tensile strength} \times \text{thickness of finishing tape}}{\text{modulus of elasticity}}.$$

2. The electrode assembly according to claim 1, wherein the thickness of the finishing tape is about 15 μm to 19 μm.

3. The electrode assembly according to claim 1, wherein the finishing tape has a width of about 10 mm or more in a wound direction of the electrode group, and a length equal to at least 25% of a total height of the electrode assembly.

4. The electrode assembly according to claim 1, wherein the finishing tape is one of two finishing tapes respectively attached to upper and lower portions of the electrode group, each of the finishing tapes has a width of about 10 mm or more in a wound direction of the electrode group, and a sum of lengths of the two finishing tapes is equal to at least 25% of a total height of the electrode assembly.

5. The electrode assembly according to claim 1, wherein the finishing tape has a width of about 10 mm or more in a wound direction of the electrode group, and a length equal to a total height of the electrode assembly.

6. The electrode assembly according to claim 1, wherein the finishing tape is one two finishing tapes respectively attached to upper and lower portions of the electrode group, a sum of lengths of the two finishing tapes is equal to at least 25% of a total height of the electrode assembly, and each of the two finishing tapes has a width in a wound direction of the electrode group that enables each of the two finishing tapes to wrap around an entire outer surface of the electrode group in the wound direction of the electrode group.

7. The electrode assembly according to claim 1, wherein the finishing tape has a length equal to a total height of the electrode assembly, and a width in a wound direction of the electrode group that enables the finishing tape to wrap around an entire outer surface of the electrode group in the wound direction of the electrode group.

8. The electrode assembly according to claim 1, wherein the finishing tape comprises a film layer and an adhesive layer, and satisfies the following equation, with Y2 ranging from 51 to 75 when a tensile strength of the finishing tape is expressed in kgf/cm$^2$, a thickness of the film layer of the finishing tape is expressed in μm, and a modulus of elasticity of the finishing tape is expressed in kgf/mm$^2$:

$$Y2 = \frac{\text{tensile strength} \times \text{thickness of film layer of finishing tape}}{\text{modulus of elasticity}}.$$

9. An electrode assembly comprising:
   an electrode group comprising a first electrode plate, a separator, and a second electrode plate that are sequentially stacked and wound; and
   a finishing tape attached to a predetermined region of a terminal portion of the electrode group;
   wherein the finishing tape comprises a film layer and an adhesive layer, and satisfies the following equation, with Y2 ranging from 51 to 75 when a tensile strength of the finishing tape is expressed in kgf/cm$^2$, a thickness of the film layer of the finishing tape is expressed in μm, and a modulus of elasticity of the finishing tape is expressed in kgf/mm$^2$:

$$Y2 = \frac{\text{tensile strength} \times \text{thickness of film layer of finishing tape}}{\text{modulus of elasticity}}.$$

10. The electrode assembly according to claim 9, wherein the thickness of the finishing tape is about 15 μm to 19 μm.

11. The electrode assembly according to claim 9, wherein the finishing tape has a width of about 10 mm or more in a wound direction of the electrode group, and a length equal to at least 25% of a total height of the electrode assembly.

12. The electrode assembly according to claim 9, wherein the finishing tape is one of two finishing tapes respectively attached to upper and lower portions of the electrode group, each of the finishing tapes has a width of about 10 mm or more in a wound direction of the electrode group, and a sum of lengths of the two finishing tapes is equal to at least 25% of a total height of the electrode assembly.

13. The electrode assembly according to claim 9, wherein the finishing tape has a width of about 10 mm or more in a wound direction of the electrode group, and a length equal to a total height of the electrode assembly.

14. The electrode assembly according to claim 9, wherein the finishing tape is one of two finishing tapes respectively attached to upper and lower portions of the electrode group, a sum of lengths of the two finishing tapes is equal to at least 25% of a total height of the electrode assembly, and each of the two finishing tapes has a width in a wound direction of the electrode group that enables each of the two finishing tapes to wrap around an entire outer surface of the electrode group in the wound direction of the electrode group.

15. The electrode assembly according to claim 9, wherein the finishing tape has a length equal to a total height of the electrode assembly, and a width in a wound direction of the electrode group that enables the finishing tape to wrap the entire outer surface of the electrode group in the wound direction of the electrode group.

16. A secondary battery comprising:
   an electrode assembly comprising:
      an electrode group comprising a first electrode plate, a separator, and a second electrode plate that are sequentially stacked and wound; and
      a finishing tape attached to a predetermined region of a terminal portion of the electrode group;
   a housing having the electrode assembly disposed therein; and
   an electrolyte injected into a margin between the housing and the electrode assembly;
   wherein the finishing tape satisfies the following equation, with Y1 ranging from 64 to 89 when a tensile strength of the finishing tape is expressed in kgf/cm$^2$, a thickness of the finishing tape is expressed in μm, and a modulus of elasticity of the finishing tape is expressed in kgf/mm$^2$:

$$Y1 = \frac{\text{tensile strength} \times \text{thickness of finishing tape}}{\text{modulus of elasticity}}.$$

17. The secondary battery according to claim 16, wherein the thickness of the finishing tape is about 15 μm to 19 μm.

18. The secondary battery according to claim 16, wherein the finishing tape has a width of about 10 mm or more in a wound direction of the electrode assembly, and a length equal to at least 25% of a total height of the electrode assembly.

19. The secondary battery according to claim 16, wherein the finishing tape comprises a film layer and an adhesive layer, and satisfies the following equation, with Y2 ranging from 51 to 75 when a tensile strength of the finishing tape is expressed in kgf/cm², a thickness of the film layer of the finishing tape is expressed in μm, and a modulus of elasticity of the finishing tape is expressed in kgf/mm²:

$$Y2 = \frac{\text{tensile strength} \times \text{thickness of film layer of finishing tape}}{\text{modulus of elasticity}}.$$

20. A secondary battery comprising:
an electrode assembly comprising:
   an electrode group comprising a first electrode plate, a separator, and a second electrode plate that are sequentially stacked and wound; and
   a finishing tape attached to a predetermined region of a terminal portion of the electrode group;
a housing having the electrode assembly disposed therein; and
an electrolyte injected into a margin between the housing and the electrode assembly;
wherein the finishing tape comprises a film layer and an adhesive layer, and satisfies the following equation, with Y2 ranging from 51 to 75 when a tensile strength of the finishing tape is expressed in kgf/cm², a thickness of the film layer of the finishing tape is expressed in μm, and a modulus of elasticity of the finishing tape is expressed in kgf/mm²:

$$Y2 = \frac{\text{tensile strength} \times \text{thickness of film layer of finishing tape}}{\text{modulus of elasticity}}.$$

21. The secondary battery according to claim 20, wherein the thickness of the finishing tape is about 15 μm to 19 μm.

22. The secondary battery according to claim 20, wherein the finishing tape has a width of about 10 mm or more in a wound direction of the electrode group, and a length equal to at least 25% of a total height of the electrode assembly.

* * * * *